US010192541B2

(12) United States Patent

Mairano et al.

(10) Patent No.: US 10,192,541 B2

(45) Date of Patent: Jan. 29, 2019

(54) SYSTEMS AND METHODS FOR GENERATING SPEECH OF MULTIPLE STYLES FROM TEXT

(71) Applicant: Nuance Communications, Inc., Burlington, MA (US)

(72) Inventors: Paolo Mairano, San Carlo Canavese (IT); Corinne Bos-Plachez, Baisieux (FR); Sourav Nandy, Lucknow (IN); Johan Wouters, Cham (CH); Silvia Maria Antonella Quazza, Turin (IT); Dong-Jian Yue, Shanghai (CN)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 15/308,731

(22) PCT Filed: Jun. 5, 2014

(86) PCT No.: PCT/CN2014/079245

§ 371 (c)(1),
(2) Date: Nov. 3, 2016

(87) PCT Pub. No.: WO2015/184615

PCT Pub. Date: Dec. 10, 2015

(65) Prior Publication Data

US 2017/0186418 A1 Jun. 29, 2017

(51) Int. Cl.

*G10L 13/00* (2006.01)
*G10L 13/08* (2013.01)

(Continued)

(52) U.S. Cl.

CPC ............ *G10L 13/10* (2013.01); *G10L 13/047* (2013.01); *G10L 13/07* (2013.01); *G10L 13/08* (2013.01)

(58) Field of Classification Search

CPC ........................................................ G10L 13/08

See application file for complete search history.

(56) References Cited

U.S. PATENT DOCUMENTS 9,865,251 B2 * 1/2018 Liu ......................... G10L 13/10
2007/0203703 A1 * 8/2007 Yoshida .................. G10L 13/10
704/260

(Continued)

FOREIGN PATENT DOCUMENTS

CN 102005205 A 4/2011
CN 103546763 A 1/2014

OTHER PUBLICATIONS

International Search Report for International Application No. PCT/CN2014/079245 dated Mar. 4, 2015.

*Primary Examiner* — Shreyans A Patel

(74) *Attorney, Agent, or Firm* — Wolf, Greenfield & Sacks, P.C.

(57) ABSTRACT

A text-to-speech (TTS) system includes components capable of supporting the generation of speech output in any of multiple styles, and may switch seamlessly from producing speech output in one style to producing speech output in another style. For example, a concatenative TTS system may include a speech base storing speech units associated with multiple speech styles, and a linguistic analysis component to generate a phonetic transcription specifying speech output in any of multiple styles. Text input may include a style indication associated with a particular segment of the input text. The linguistic analysis component may invoke encoded rules and/or components based upon the style indication, and generate a phonetic transcription specifying a speech style, which may be processed to generate output speech.

16 Claims, 6 Drawing Sheets

(51) Int. Cl.

| | |
|---|---|
| ***G10L 15/26*** | (2006.01) |
| ***G10L 13/10*** | (2013.01) |
| ***G10L 13/047*** | (2013.01) |
| ***G10L 13/07*** | (2013.01) |

(56) References Cited

U.S. PATENT DOCUMENTS

| | | | | |
|---|---|---|---|---|
| 2013/0054244 | A1* | 2/2013 | Bao | G10L 13/10<br>704/260 |
| 2013/0080160 | A1 | 3/2013 | Fume et al. | |
| 2017/0169811 | A1* | 6/2017 | Sabbavarapu | G10L 13/08 |

* cited by examiner

PRIOR ART

SYSTEMS AND METHODS FOR GENERATING SPEECH OF MULTIPLE STYLES FROM TEXT

BACKGROUND

Text-to-speech (TTS) systems generate output speech based upon input text. FIG. 1 depicts a representative conventional TTS system 100 which performs concatenative speech generation. In representative system 100, input text 105 (e.g., received from a user, an application, or one or more other entities) is processed by linguistic analysis component (LAC) 110 to generate phonetic transcription 115. Unit selection module 120 processes the phonetic transcription generated by LAC 110 to select speech units from speech base 125 that correspond to the sounds (e.g., phonemes) in the phonetic transcription and concatenates those speech units to generate speech output 130.

Conventional TTS systems may be capable of generating output speech in different styles. A style of speech is defined mainly by the tone, attitude and/or mood which the speech adopts toward a subject to which it is directed. For example, a didactic speech style is typically characterized by a slow, calm tone which an adult would typically adopt in teaching a child, with pauses interspersed between spoken words to enhance intelligibility. Other speech styles which conventional TTS systems may generate include neutral, joyful, sad and ironic speech styles.

A speech style is characterized to some extent by a combination of underlying speech parameters (e.g., speech rate, volume, duration, pitch height, pitch range, intonation, rhythm, the presence or absence of pauses, etc.), and how those parameters vary over time, both within words and across multiple words. However, while speech in a first style may be characterized by a different range of values for a specific parameter than speech in a second style (e.g., speech in a joyful style may have a faster speech rate than speech in a neutral style), simply modifying the speech in the first style to exhibit the parameter values characteristic of the second style does not result in speech in the second style being produced (e.g., one cannot produce speech in a joyful style simply speeding up speech in a neutral style).

Conventional concatenative TTS systems generate speech output in more than one style by employing a different "voice" for each style, with each "voice" having an associated style-specific linguistic analysis component (LAC) and speech base. A style-specific linguistic analysis component may include programmatically implemented linguistic rules relating to a particular speech style. A style-specific speech base may store speech units generated from recordings of a speaker speaking in the particular speech style, or derivations of such recordings (e.g., produced by applying filters, pitch modifications or other post-processing).

A representative conventional concatenative TTS architecture 200 operative to generate output speech in neutral, joyful or didactic styles is depicted in FIG. 2. Architecture 200 includes systems 200A, 200B and 200C, with system 200A being operative to generate speech in a neutral style, 200B being operative to generate speech in a joyful style, and 200C being operative to generate speech in a didactic style. Each system includes an associated style-specific linguistic analysis component (LAC) and speech base. Thus, system 200A includes neutral style-specific linguistic analysis component (LAC) 210A and neutral style-specific speech base 225A. Similarly, system 200B includes joyful style-specific linguistic analysis component (LAC) 210B and joyful style-specific speech base 225B, and system 200C includes didactic style-specific linguistic analysis component (LAC) 210C and didactic style-specific speech base 225C. Linguistic analysis components 210A, 210B, 210C process respective input text 205A, 205B and 205C to generate phonetic transcriptions 215A, 215B and 215C. The phonetic transcriptions are processed by respective unit selection modules 220A, 220B, 220C to generate speech output. That is, unit selection 220A processes phonetic transcription 215A to select and concatenate speech units from neutral style-specific speech base 225A to produce neutral speech output 230A, unit selection 220B processes phonetic transcription 215B to select and concatenate speech units from joyful style-specific speech base 225B to produce joyful speech output 230B, and unit selection 220C processes phonetic transcription 215C to select and concatenate speech units from didactic style-specific speech base 225C to produce didactic speech output 230C.

SUMMARY

The inventors have appreciated that, in a conventional TTS system, switching from generating speech output in one style to generating speech output in another style requires changing the system's "voice." That is, to switch from producing speech output in a first style to producing speech output in a second style, a conventional system must unload from memory a linguistic analysis component and speech base specific to the first style, and load to memory a linguistic analysis component and speech base associated with the second style. Unloading and loading components and data from memory not only represents an unnecessary expenditure of computational resources, but also takes time. As such, a conventional TTS system cannot switch seamlessly from producing speech output in one style to producing output in another style.

In accordance with some embodiments of the invention, a TTS system is capable of switching seamlessly from producing speech output in one style to producing speech output in another style. In some embodiments, one or more components of the TTS system are not style-specific, but rather support producing speech output in any of multiple styles. Thus, switching from generating speech output in a first style to generating speech output in a second style does not require unloading from memory a linguistic analysis component and speech base specific to the first style and loading to memory a linguistic analysis component and speech base associated with the second style, as in conventional systems. Because the switch from one output style to another is seamless, some embodiments of the invention may be capable of generating, in a single sentence of output, speech in a plurality of styles.

In some embodiments of the invention, a text-to-speech system includes a linguistic analysis component operative to process one or more style indications included in text input, with each style indication being associated with a segment of the text input. A style indication may, for example, comprise a tag (e.g., a markup tag), and/or any other suitable form(s) of style indication. Based on a style indication for a segment of text input, the linguistic analysis component may invoke encoded rules and/or components relating to the indicated style, and generate a phonetic transcription which specifies a style of speech to be output for the segment. As such, in some embodiments of the invention, a linguistic analysis component may be dynamically configured at run time, based upon speech style indications provided in text input, to generate phonetic transcriptions for speech in any of various styles. In embodiments of the invention which support concatenative speech generation, a unit selection component may process the phonetic transcription by selecting and concatenating speech units stored in a speech base to generate speech output. In embodiments of the invention which support speech generation based upon statistical modeling techniques, a statistical model associated with a style of speech specified in the phonetic transcription may be applied to generate speech output.

Some embodiments of the invention are directed to a method for use in a text-to-speech system comprising a linguistic analysis component operative to generate a phonetic transcription based upon input text, and at least one speech generation component operative to generate output speech based at least in part on the phonetic transcription. The method comprises acts of: (A) receiving, by the linguistic analysis component, input text produced by a text-producing application, wherein the text produced by a text-producing application comprises a speech style indication indicating a style of speech to be output by the text-to-speech system for an associated segment of the input text; (B) generating, by the linguistic analysis component, a phonetic transcription based at least in part on the input text, the phonetic transcription specifying a style of speech to be output by the at least one speech generation component for the segment of the input text according to the speech style indication; and (C) generating, by the at least one speech generation component, output speech based at least in part on the phonetic transcription generated in the act (B).

Other embodiments of the invention are directed to a text-to-speech system which comprises at least one computer processor programmed to: receive input text produced by a text-producing application, wherein the text produced by a text-producing application comprises a speech style indication indicating a style of speech to be output by the text-to-speech system for an associated segment of the input text; generate a phonetic transcription based at least in part on the input text, the phonetic transcription specifying a style of speech to be output for the segment of the input text according to the speech style indication; and generate output speech based at least in part on the generated phonetic transcription.

Yet other embodiments of the invention are directed to at least one non-transitory computer-readable storage medium having instructions encoded thereon which, when executed in a computer system, cause the computer system to perform a method. The method comprises acts of: (A) receiving input text produced by a text-producing application, wherein the text produced by a text-producing application comprises a speech style indication indicating a style of speech to be output by the text-to-speech system for an associated segment of the input text; (B) generating a phonetic transcription based at least in part on the input text, the phonetic transcription specifying a style of speech to be output for the segment of the input text according to the speech style indication; and (C) generating output speech based at least in part on the phonetic transcription generated in the act (B).

The foregoing is a non-limiting summary of certain aspects of the present invention, some embodiments of which are defined by the attached claims.

DETAILED DESCRIPTION

Some embodiments of the invention are directed to a TTS system capable of generating speech output in any of multiple styles, and switching seamlessly from producing speech output in one style to producing speech output in another style, without changing the "voice" of the system. For example, some embodiments of the invention are directed to a concatenative TTS system which includes a speech base storing speech unit recordings associated with multiple speech styles, and a linguistic analysis component operative to generate a phonetic transcription specifying speech output in any of multiple styles. Text input processed by the linguistic analysis component may, for example, include at least one style indication, with each style indication being associated with a particular segment of the input text. The style indication for a segment of input text may cause the linguistic analysis component to invoke encoded rules and/or components relating to the indicated style. The linguistic analysis component may generate a phonetic transcription which specifies a style for speech to be output for the segment. A unit selection component may process the phonetic transcription by selecting and concatenating speech units from the speech base so as to produce speech output for each segment in the indicated style.

A concatenative TTS system implemented in accordance with these embodiments may offer numerous advantages over conventional concatenative TTS systems. In this respect, a concatenative TTS system which includes a linguistic analysis component capable of generating phonetic transcriptions which include multiple speech styles and a speech base which stores speech unit recordings in multiple speech styles may be capable of switching between producing output speech in one style to producing speech output in another style seamlessly, without changing the "voice" of the system. As such, a concatenative TTS system implemented in accordance with some embodiments of the invention may be capable of producing speech output which includes multiple speech styles in a single sentence, and may offer improved performance and reduced latency as compared to conventional concatenative TTS systems. These and other advantages are described in detail below.

Figure 3:
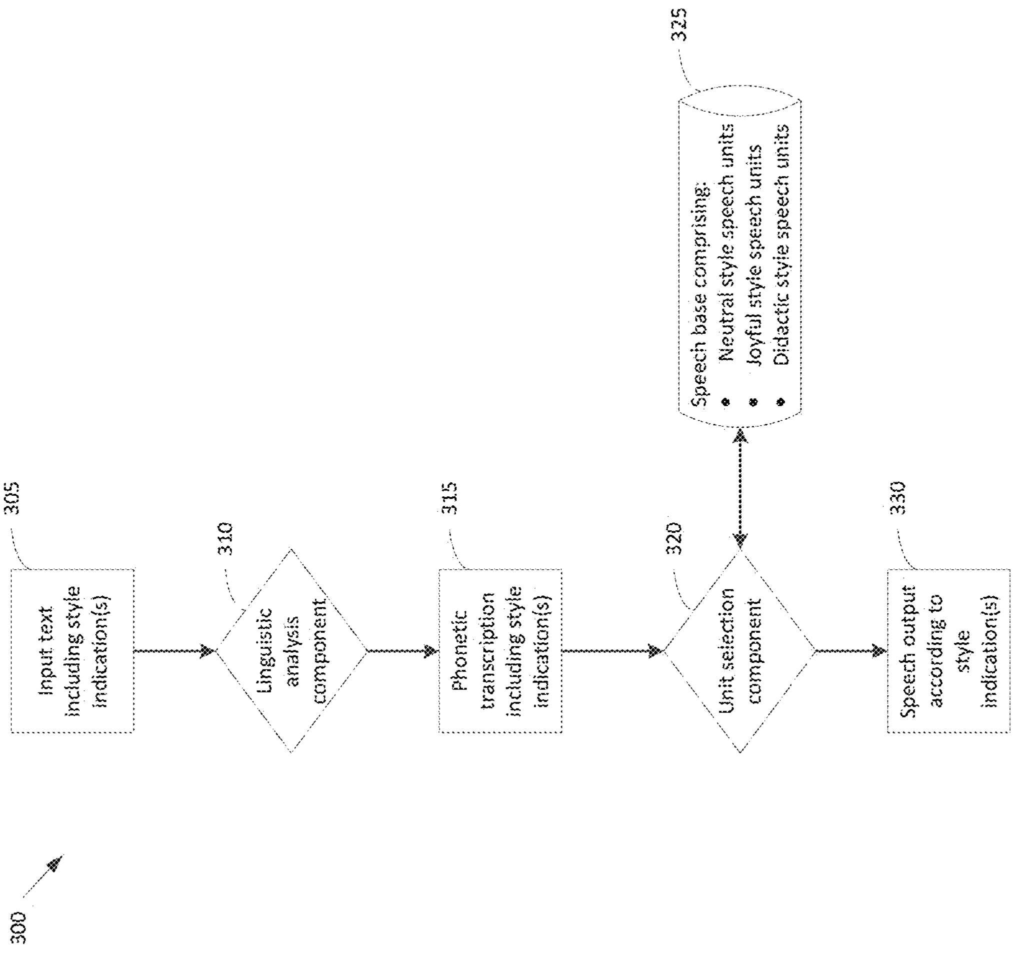
FIG. 3 is a block diagram depicting a representative concatenative TTS system configured to generate speech output in any of multiple speech styles, in accordance with some embodiments of the invention.

FIG. 3 depicts a representative concatenative TTS system 300 implemented in accordance with some embodiments of the invention. Components of representative system 300 include linguistic analysis component 310, unit selection component 320 and speech base 325. FIG. 3 also depicts various input to, and output produced by, those components (shown as rectangles in FIG. 3). The components of, input to and output produced by representative system 300 are described below.

Linguistic analysis component 310 is operative to specify speech output in any of various speech styles. In some embodiments of the invention, linguistic analysis component 310 may be implemented via software. However, embodiments of the invention are not limited to such an implementation, as linguistic analysis component 310 may alternatively be implemented via hardware, or a combination of hardware and software.

Linguistic analysis component 310 processes input text 305, which may be supplied by a user, by a text-producing application, by one or more other entities, or any combination thereof. In some embodiments of the invention, input text 305 includes one or more style indications, with each style indication being associated with a particular segment of the input. Any suitable style indication may be provided, as embodiments of the invention are not limited in this respect. For example, in some embodiments, a style indication may comprise a tag (e.g., a markup tag) which precedes the associated segment of text input. A representative sample of input text is shown below. In the sample shown, four discrete segments of input text have style indications of neutral, joyful, didactic and neutral, respectively:

\style=neutral\ This sentence will be synthesized in neutral style. \style=joyful\ This sentence will be synthesized in joyful style. \style=didactic\ This sentence will be synthesized in didactic style. \style=neutral\ This sentence will be synthesized in neutral style again.

It should be appreciated that, although in the sample above a segment of input text is associated with a style indication which immediately precedes it, embodiments of the invention are not limited to such an implementation. In this respect, a style indication may be associated with a segment of input text in any suitable way, and need not be placed contiguous (e.g., immediately preceding, immediately following, etc.) to the segment, as in the sample shown above.

It should also be appreciated that although each style indication in the sample above is associated with a segment of input text that comprises a complete sentence, embodiments of the invention are not limited to such an implementation. As described further below, in some embodiments of the invention, a style indication may be associated with a segment of input text comprising any suitable number of words, including a single word.

In representative system 300, linguistic analysis component 310 processes a style indication for an associated segment of text input by invoking rules and/or components that are specific to the indicated style. These style-specific rules and/or components are then used to generate a portion of phonetic transcription 315 corresponding to the segment. Using the example text input shown above to illustrate, upon encountering the "\style=neutral\" tag at the beginning of the text input, linguistic analysis component 310 may invoke rules and/or components specific to the neutral style, and generate a portion of phonetic transcription 315 corresponding to the text segment "This sentence will be synthesized in neutral style." This portion of the phonetic transcription 315 may include an indication that synthesized speech for this segment should be output in a neutral style. In some embodiments, the indication may comprise a markup tag, but this indication may be provided in any other suitable fashion.

In some embodiments, after generating the portion of the phonetic transcription corresponding to the text segment "This sentence will be synthesized in neutral style," linguistic analysis component encounters the "\style=joyful\" tag. As such, linguistic analysis component 310 may invoke rules and/or components specific to the joyful style, and generate a portion of phonetic transcription 315 corresponding to the text segment "This sentence will be synthesized in joyful style." This portion of the phonetic transcription may include an indication that synthesized speech for this segment is to be output in a joyful style. Linguistic analysis component 310 may continue to process segments of the input text until the input text has been processed in its entirety.

It should be appreciated that although in the example above, text segments and associated style indications are processed sequentially in the order presented in the input text, embodiments of the invention are not limited to such an implementation, and may be processed in any suitable order. As one example, text segments may be processed according to associated style indication, so that all text segments having a first associated style indication (e.g., a "\style=neutral\" tag) may be processed first, and then all segments having a second associated style indication (e.g., a "\style=joyful\" tag) may be processed next, and so on until all input text has been processed. Text segments and associated style indications may be processed in any suitable fashion, as embodiments of the invention are not limited in this respect.

Unit selection component 320 processes phonetic transcription 315 to generate output speech. Specifically, unit selection component 320 selects and concatenates speech units (e.g., demiphones, diphone, triphones, and/or any other suitable speech unit(s)) stored in speech base 315 based upon specifications set forth in phonetic transcription 315. Like linguistic analysis component 310, unit selection component 320 may be implemented via software, hardware, or a combination thereof.

In representative system 300, speech base 325 stores speech units of multiple styles, with each speech unit having a particular style indication (e.g., a tag, such as a markup tag, or any other suitable indication). For example, demiphones from joyful recordings may each have an associated joyful style indication, demiphones from didactic recordings may each have an associated didactic style indication, demiphones from neutral recordings may each have an associated neutral style indication, and so on. Thus, in processing a segment of phonetic transcription 315 having a particular style indication (e.g., a tag indicating that speech output should be produced in a neutral style), unit selection component 320 may select speech units stored in speech base 325 of the indicated style (e.g., speech units tagged as being neutral style). Phonetic transcription 315 may also specify additional linguistic characteristics (e.g., pitch, speech rate, and/or other characteristics) which are employed by unit selection component 320 in generating speech output 330.

It should be appreciated that a concatenative TTS system capable of generating speech output in any of multiple speech styles using only a single linguistic analysis component and single speech base offers numerous advantages over conventional concatenative TTS systems. One advantage is the ability to switch from producing speech output in one style to producing speech output in another style without expending processing resources to switch voices. This advantage is illustrated in the description of FIGS. 4A and 4B below.

Figure 4B:
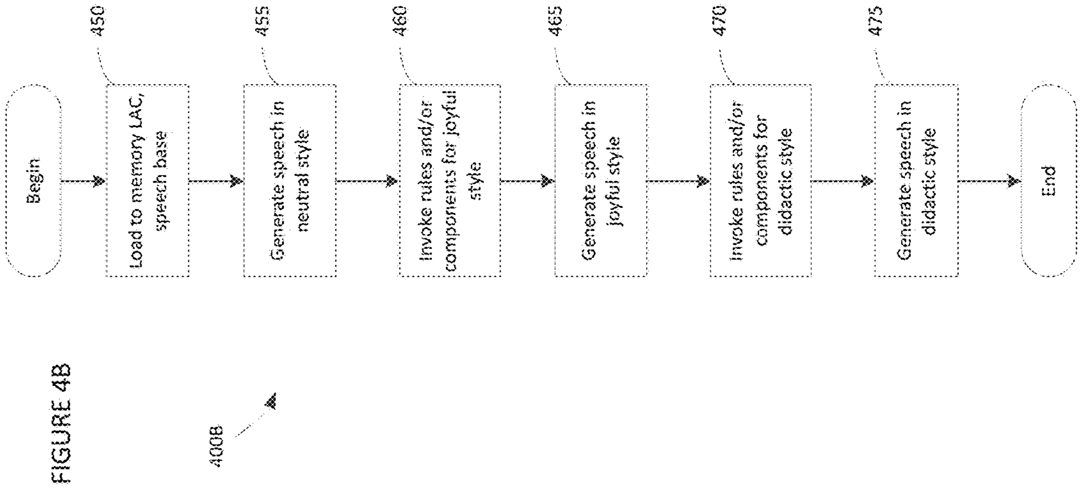
FIG. 4B is a flowchart depicting a process whereby a TTS system produces speech output in multiple styles without changing the voice, in accordance with some embodiments of the invention.
Figure 4A:
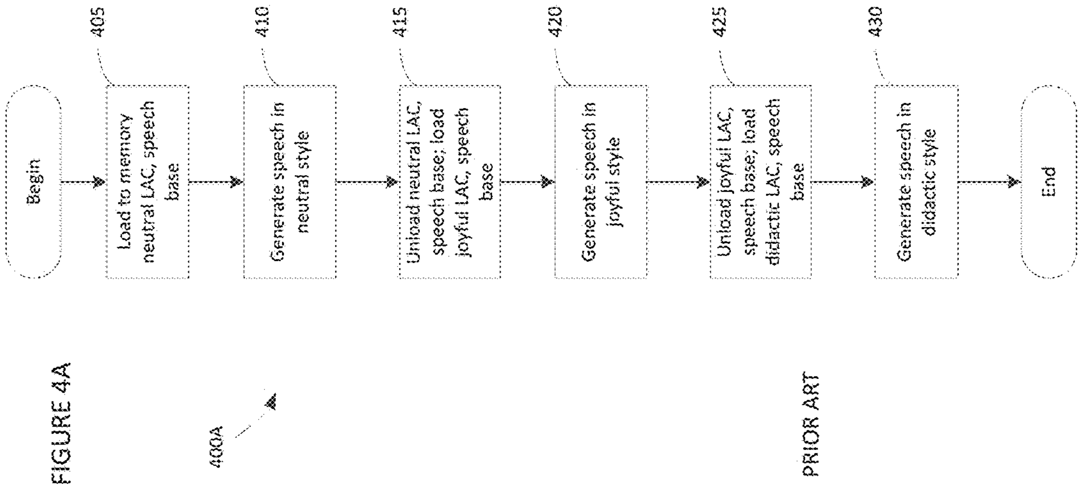
FIGURE 4A PRIOR ART
FIG. 4A is a flowchart depicting a conventional process whereby a TTS system switches from producing speech output in one style to producing speech output in another style.

FIG. 4A depicts a process performed by a conventional concatenative TTS system, and FIG. 4B depicts a process performed by a concatenative TTS system implemented in accordance with some embodiments of the invention. That is, representative process 400A, shown in FIG. 4A, is performed by a conventional concatenative TTS system, and representative process 400B, shown in FIG. 4B, is performed by a concatenative TTS system implemented in accordance with embodiments of the invention. Referring first to FIG. 4A, at the start of representative process 400A, conventional TTS system sets a neutral style for speech output by loading a neutral style "voice" including a neutral style-specific linguistic analysis component and neutral style-specific speech base to memory in act 405. Representative process 400A then proceeds to act 410, wherein speech in a neutral style is generated as output.

Referring now to FIG. 4B, to set a neutral style for speech output, a concatenative TTS system implemented in accordance with some embodiments of the invention loads to memory a linguistic analysis component and a speech base which are capable of supporting multiple speech styles in act 450. The system generates neutral-style speech output in act 455.

Referring again to FIG. 4A, to switch from generating speech output in the neutral style to generating speech output in the joyful style, the conventional concatenative TTS system unloads the neutral style-specific linguistic analysis component and neutral style-specific speech base from memory, and then loads a joyful style-specific linguistic analysis component and joyful style-specific speech base to memory in act 415. It should be appreciated that style-specific linguistic analysis components and speech bases typically consume significant storage resources, so that unloading one style-specific linguistic analysis component and speech base from memory and loading another style-specific linguistic analysis component and speech base to memory expends significant processing resources, and takes time. Conventional concatenative TTS system then outputs generated speech in the joyful style in act 420.

By contrast, a concatenative TTS system implemented in accordance with embodiments of the invention switches from producing neutral style speech output to producing joyful style speech output by the linguistic analysis component invoking rules and/or components associated with the joyful style in act 460. This switch is nearly instantaneous, and results in minimal processing resources being expended. The system then generates joyful style speech output in act 465.

Referring again to FIG. 4A, to make another switch from producing speech output in the joyful style to producing speech output in the didactic style, the conventional concatenative TTS system repeats the unload/load process described above in relation to act 415, by unloading the joyful style-specific linguistic analysis component and joyful style-specific speech base from memory, and loading a didactic style-specific linguistic analysis component and didactic style-specific speech base to memory in act 425. This switch, like the switch described above, is time- and resource-intensive. The conventional system then generates didactic style speech output in the act 430, and process 400A then completes.

By contrast, a concatenative TTS system implemented in accordance with embodiments of the invention switches from producing joyful style speech output to producing didactic style speech output by the linguistic analysis component invoking rules and/or components associated with the didactic style in act 465. As described above, this switch is seamless and results in comparatively little processing resources being expended. The system then generates didactic style output speech in the act 475, and process 400B then completes.

It should be appreciated that although the example given above relates to making only two switches in output speech styles (i.e., from neutral to joyful, and then from joyful to didactic), in some implementations, numerous switches may be desirable and are possible. Thus, it can be seen that by conserving processor cycles and time with each switch, embodiments of the invention may conserve significant resources (e.g., processing resources) for use by other components, enable significantly faster performance, and/or consume significantly less power, and these advantages will compound over time.

Another advantage which a concatenative TTS system capable of generating speech output in any of multiple speech styles using only a single linguistic analysis component and single speech base offers over conventional concatenative TTS systems is the ability to switch between output speech styles seamlessly, without a discernible delay or pause between output speech styles. In this respect, the inventors have appreciated that some conventional concatenative TTS systems may conserve processing resources by loading multiple sets of style-specific components to memory at once, so that unloading components specific to one style and loading components specific to another style is not necessary. The inventors have also appreciated, however, that even if sufficient memory resources are available to store the multiple sets of components, making a switch from producing speech output in a first style to producing speech output in a second style conventionally results in a pause between speech output in the first style and speech output in the second style. By contrast, in accordance with some embodiments of the invention, the transition between output speech styles is seamless, without a pause being introduced between output speech of different styles, as the linguistic analysis component merely switches from invoking one set of rules specific to the first style to invoking another set of rules specific to the second style, and including the result of processing according to the invoked rules in the phonetic transcription.

Some embodiments of the invention allow speech output to be produced which includes speech of multiple styles in a single sentence. For example, one or more words of the sentence may be output in a first speech style, and one or more other words of the same sentence may be output in a second speech style. For example, consider the input text:

\style=neutral\ These words will be synthesized in neutral style, and \style=joyful\ these words will be synthesized in joyful style.

This input text may be processed so that the words "These words will be synthesized in neutral style, and" are output in neutral style, and the words "these words will be synthesized in joyful style" are output in joyful style. In some embodiments, no pause is introduced between the output in the different styles. Conventional concatenative TTS systems, even those which load multiple sets of style-specific components to memory at once, are incapable of producing speech output wherein a single sentence includes speech of multiple styles.

Figure 1:
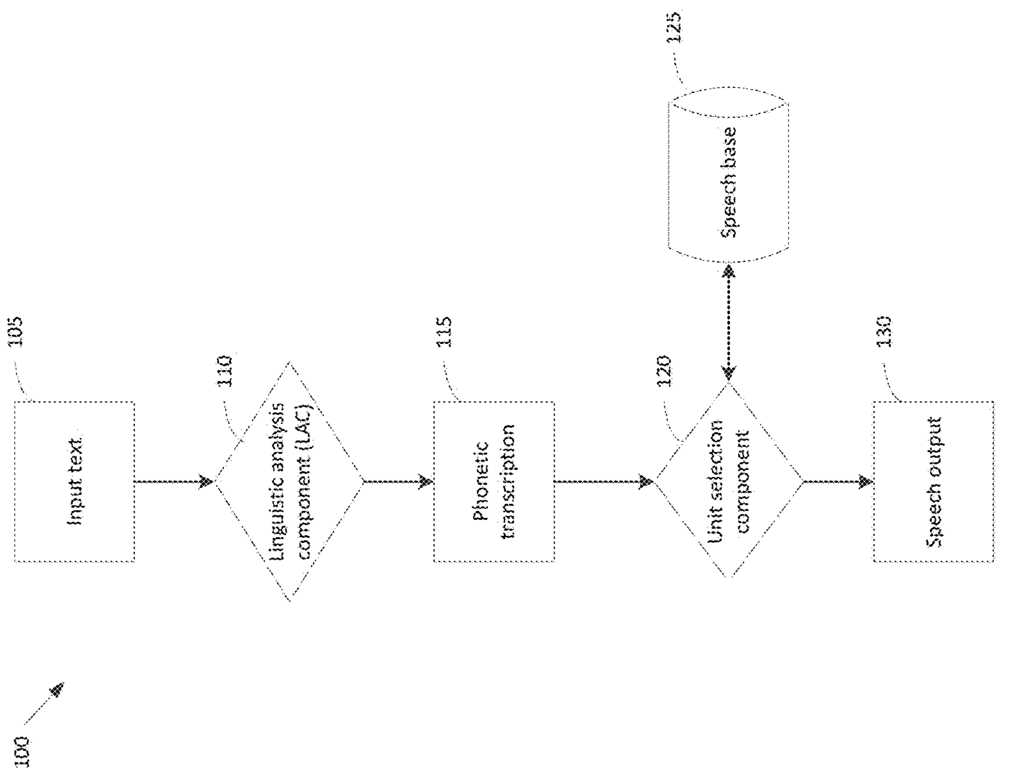
FIG. 1 is a block diagram depicting a conventional concatenative TTS system.
Figure 2:
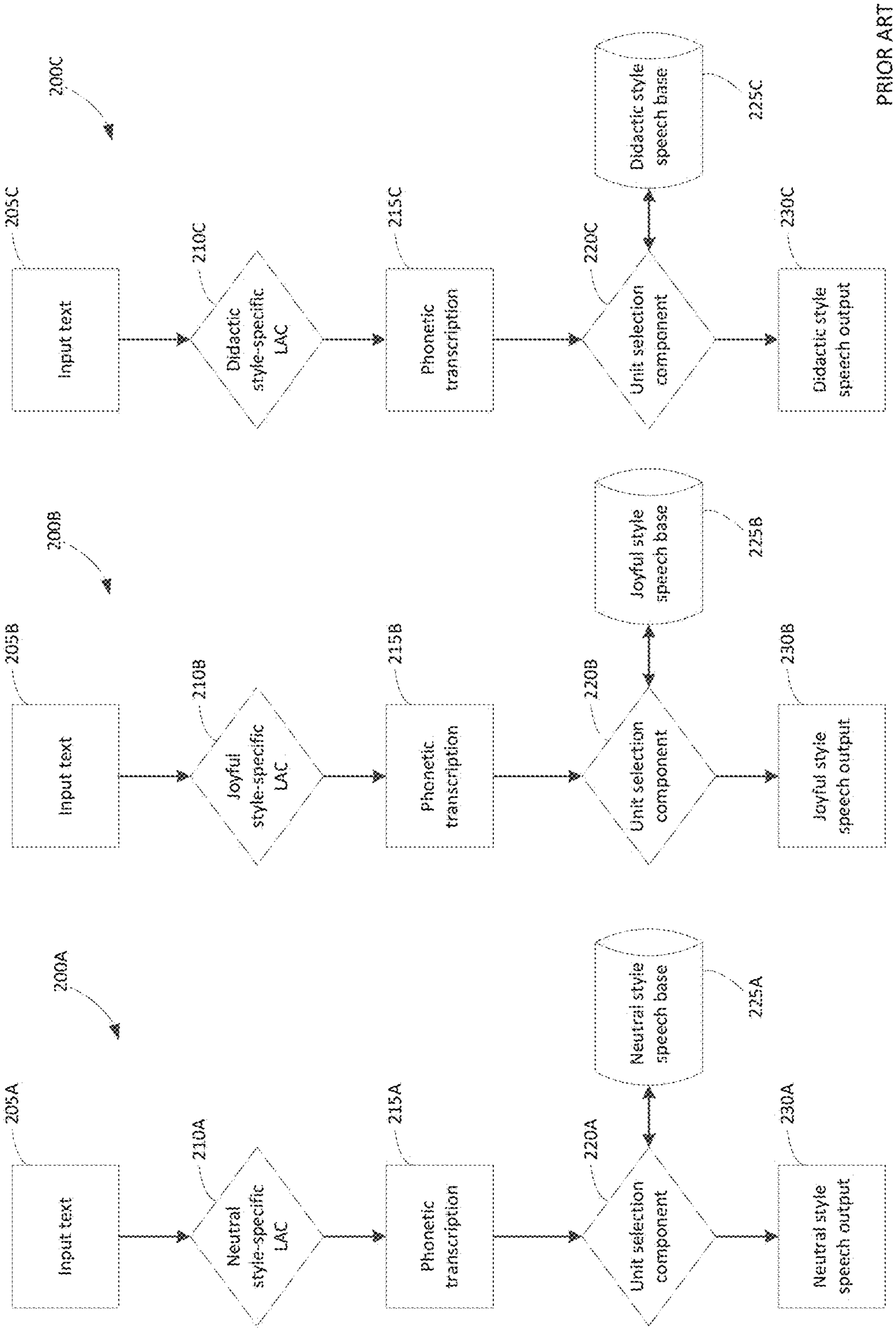
PRIOR ART FIGURE 2
FIG. 2 is a block diagram depicting a representative conventional architecture for generating speech output in multiple styles.

In some conventional implementations, an application may be configured to provide input to a TTS system, but may not be configured to take advantage of all of the speech styles supported by the TTS system. Using the example of FIG. 2 to illustrate, an application may be configured to provide input text to style-specific linguistic analysis components 210A and 210B to produce neutral and joyful style speech output, but not to generate didactic style speech. In such conventional implementations, configuring the application to take advantage of an additional speech style may necessitate significant modifications to the application (e.g., to introduce API calls, etc.), testing of the application, testing of the integration of the application and TTS system, etc. By contrast, with some embodiments of the invention, enabling an application to take advantage of an additional output speech style may be accomplished by merely modifying the application to insert an additional type of style indication (e.g., tag) into input text.

A concatenative TTS system implemented in accordance with some embodiments of the invention offers a reduction in the storage resources used to store linguistic analysis components as compared to conventional concatenative TTS systems. In this respect, the inventors have recognized that, in conventional TTS systems which include multiple style-specific linguistic analysis components, there is significant overlap between the program logic and data employed by the different linguistic analysis components. By consolidating the program logic and data into a single linguistic analysis component, some embodiments of the invention may realize significant storage savings. Additionally, the amount of effort associated with maintaining and enhancing a single linguistic analysis component over time may be significantly less than the amount of effort associated with maintaining and enhancing multiple separate linguistic analysis components as used by conventional TTS systems.

Some embodiments of the invention may employ techniques to minimize the amount of storage and memory resources used by a speech base capable of supporting multiple output speech styles in a concatenative TTS system. In some embodiments of the invention, a TTS system may be configured to employ speech units associated with one speech style to generate speech output in another speech style, thereby conserving storage resources. For example, speech units associated with a neutral output speech style may be processed at run time so as to produce output speech in a hyper-articulated (e.g., didactic) style, so that it is unnecessary to store separate speech units to support the hyper-articulated style.

The run time processing which is performed to produce didactic style speech output from neutral style speech units may take any of numerous forms. For example, the phonetic transcription that is generated by a linguistic analysis component may specify post-processing to be performed on concatenated neutral style speech units to generate didactic style speech output. In one example, the phonetic transcription may specify a slower speech rate (e.g., 80-85% of the speech rate normally used for neutral style output speech) to produce didactic style speech output.

In another example, the phonetic transcription may specify that pauses be interspersed in output speech at linguistically appropriate junctures. In this respect, in neutral style speech, pauses are typically inserted only in correspondence to punctuation. Thus, the sentence "This evening we will have dinner with our neighbors at 9 o'clock, so we'll meet in front of the restaurant at 14 Main Street" may be output in neutral style as "This evening we will have dinner with our neighbors at 9 o'clock <pause> so we'll meet in front of the restaurant at 14 Main Street." In accordance with some embodiments of the invention, however, a phonetic transcription may specify that pauses be introduced elsewhere in a sentence, so as to produce the enhanced intelligibility which is characteristic of the didactic speech style, even when using neutral style speech units. Using the example sentence given above to illustrate, a phonetic transcription may specify that pauses be inserted so that the following speech is output: "This evening <pause> we will have dinner with our neighbors <pause> at 9 o'clock <pause> so we'll meet in front of the restaurant <pause> at 14 Main Street." By inserting pauses at linguistically appropriate junctures, embodiments of the invention may employ neutral style speech units to produce speech output having the qualities of didactic style speech, such as the slow, calm style that an adult might use in attempting to explain a new concept to a child.

Of course, the run time processing described above may be performed to produce speech output in any suitable hyper-articulated style, including styles other than the didactic style. Embodiments of the invention are not limited in this respect.

A concatenative TTS system may be configured to insert pauses at linguistically appropriate junctures to generate didactic style speech output in any suitable fashion. In some embodiments of the invention, a prosody model may be employed to insert pauses. A prosody model may, for example, be produced through machine learning techniques, hand-crafted rules, or a combination thereof. For example, some embodiments of the invention may employ a combination of machine learning techniques and hand-crafted rules so as to benefit from the development pace, model naturalness and adaptability characteristic of machine learning techniques, and also the ability to fix bugs and tune the model which are characteristic of hand-crafted rules.

Any suitable machine learning technique(s) may be employed. For example, in some embodiments, the IGTree learning algorithm, which is a memory-based learning technique, may be employed. Results generated by the IGTree learning algorithm and any hand-crafted rules may, for example, be represented in a tree data structure which is processed by the linguistic analysis component in generating a phonetic transcription for speech output. For example, a speech style indication provided in input text which indicates that speech output is to be produced in a didactic style may cause the linguistic analysis component to traverse the tree data structure and generate a phonetic transcription specifying that didactic style speech is to be output for a segment of the input text.

A prosody model which is employed to produce speech output in a didactic style may be trained in any suitable fashion. In some embodiments of the invention, a prosody model may be automatically trained from a labeled corpus, which may be created, for example, by manual labeling, extracting silence speech units from didactic style recordings, pruning breaks from a training text which includes weak prosodic breaks via rules, pruning breaks from a training text which includes syntactic breaks via rules, and/or one or more other techniques.

Although the illustrative embodiments described above relates to generating a hyper-articulated style speech from neutral style speech units, it should be appreciated that embodiments of the invention are not limited to such an implementation, and that speech output in any particular style may be generated from speech units associated with any one or more other styles. Further, any suitable technique may be used to generate speech output in one style using speech units associated with one or more other styles. For example, a variation of the prosody model described above which is used to generate didactic style speech may be used to generate speech output in one or more other styles. Any suitable technique(s) may be employed.

The inventors have recognized that, in certain applications, it may be less desirable to generate speech output in one particular style from speech units associated with another particular style. For example, it may not be feasible to generate didactic style speech output using joyful style speech units. As such, in some embodiments of the invention, information may be stored (e.g., in the speech base) which represents a "cost" at which speech units associated with one style may be used to generate speech output of another specified style. For example, this information may specify a relatively low "cost" associated with using a neutral style speech unit to generate didactic style speech output, but a relatively high "cost" associated with using a joyful style speech unit to generate didactic style speech output. The information representing a "cost" may be processed, for example, by a unit selection component configured to minimize the associated "cost" for concatenated speech units.

Some embodiments of the invention are not limited to generating speech using concatenative speech generation. Any suitable speech generation technique(s) may be employed. For example, some embodiments of the invention may employ statistical modeling techniques (e.g., Hidden Markov Model (HMM) techniques, and/or one or more other statistical modeling techniques) to generate speech output.

Typically, statistical modeling techniques (e.g., HMM techniques) involve a training phase during which parameters of statistical models are derived. For HMM techniques, the statistical models are typically Gaussians, and the parameters typically represent means and variances of Mel Cepstral Frequency Coefficients (MFCC) associated with an HMM state. The statistical parameters are clustered by means of a decision tree. In each node of the decision tree a question is asked related to the phonetic and prosodic context of the state. The question results in an optimal split of the parameters.

Figure 5:
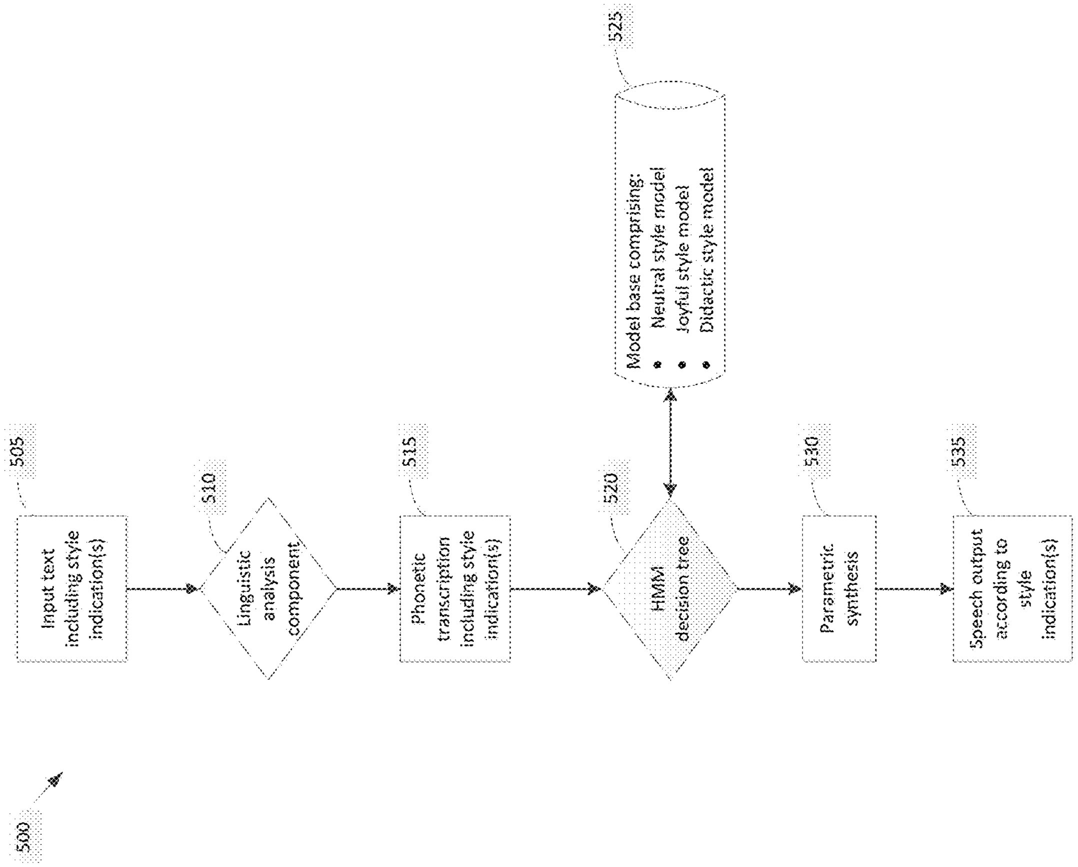
FIG. 5 is a block diagram depicting a representative TTS system configured to employ statistical modeling techniques to generate speech output in any of multiple speech styles, in accordance with some embodiments of the invention.

FIG. 5 depicts components of a representative TTS system 500 configured to employ statistical modeling techniques in generating speech output. The components of representative system 500 include linguistic analysis component 510, HMM decision tree 520, model base 525 and parametric synthesis component 530. FIG. 3 also depicts various input to, and output produced by, those components. The components of, input to and output produced by representative system 500 are described below.

Representative system 500 is similar to representative system 300 (FIG. 3) in that linguistic analysis component 510, like linguistic analysis component 310 (FIG. 3), is configured to specify speech output in any of multiple styles. Linguistic analysis component 510 receives input text 505 from a user, text-producing application, one or more other entities, or a combination thereof. Input text 505 includes one or more style indications (e.g., tags), with each style indication being associated with a particular segment of the text input. Linguistic analysis component 510 invokes rules and/or components specific to each indicated style in generating a phonetic transcription 515. However, rather than being used by a unit selection component to select and concatenate speech units stored in a speech base, the phonetic transcription 515 is used by decision tree 520 to apply one of the models stored in model base 525 (in representative system 500, joyful, neutral and didactic models) to generate speech output. Specifically, in some embodiments of the invention, a style indication included in the phonetic transcription 515 may be used to generate a question which is inserted near the top nodes of a decision tree that is employed to select the model that is used in generating speech output. A model which is used to generate speech output in a particular style may be developed and trained in any suitable fashion, such as by employing known techniques.

In some embodiments of the invention, a TTS system may enable one or more external components (e.g., applications) to determine the output speech style(s) that the TTS system supports. For example, in some embodiments, a TTS system may provide an API which an external component may access (e.g., may query) to determine the output speech style(s) that are supported by the system. Such an API may, for example, enable the external component to query the system's linguistic analysis component, speech base (if a speech base is provided), model base (if a model base is provided), and/or any other suitable component(s) to identify the output speech style(s) which are supported.

It should be appreciated that although the foregoing description relates to a TTS system capable of producing speech output in neutral, joyful and didactic styles, in some implementations, a TTS system may be configured to produce speech output in one or more additional styles, or in multiple styles that do not include all three of the neutral, joyful and didactic styles. A TTS system implemented in accordance with embodiments of the invention may support speech generation in any two or more suitable styles.

Figure 6:
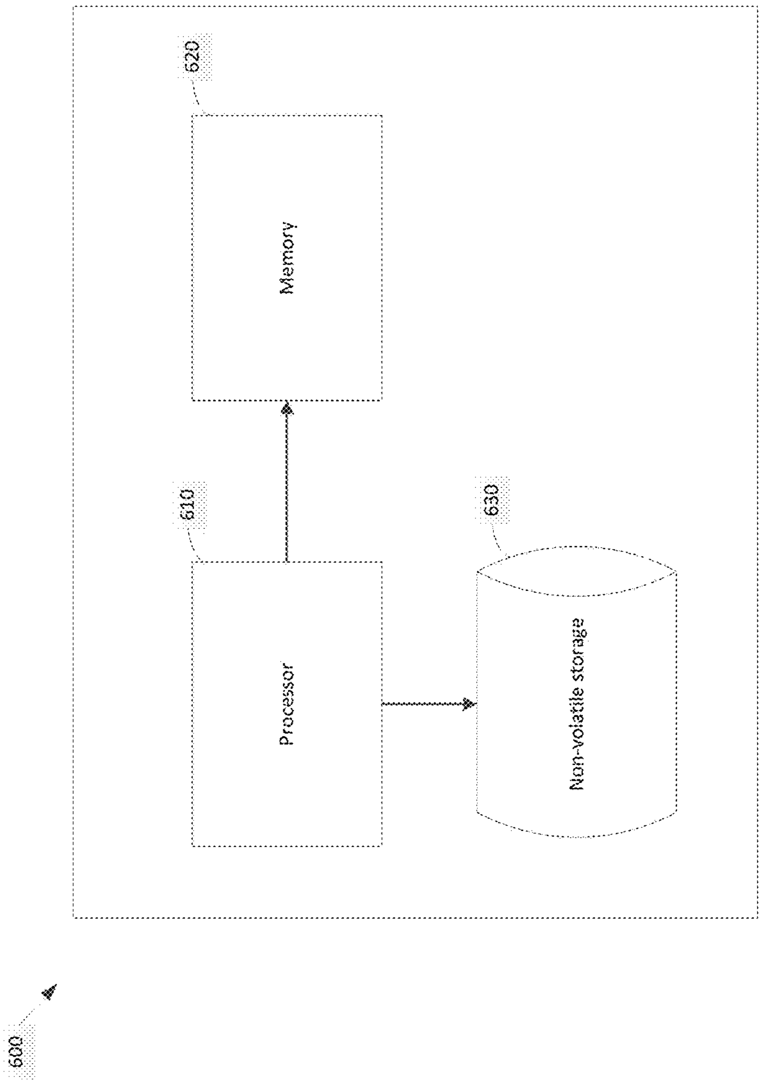
FIG. 6 is a block diagram depicting a representative computer system with which some embodiments of the invention may be implemented.

It should be appreciated from the foregoing that some embodiments of the invention may be implemented using a computer system. A representative computer system 600 that may be used to implement some aspects of the present invention is shown in FIG. 6. The computer system 600 may include one or more processors 610 and computer-readable storage media (e.g., memory 620 and one or more non-volatile storage media 630, which may be formed of any suitable non-volatile data storage media). The processor 610 may control writing data to and reading data from the memory 620 and the non-volatile storage device 630 in any suitable manner, as the aspects of the present invention described herein are not limited in this respect. To perform any of the functionality described herein, the processor 610 may execute one or more instructions stored in one or more computer-readable storage media (e.g., the memory 620), which may serve as non-transitory computer-readable storage media storing instructions for execution by the processor 610.

The above-described embodiments of the invention may be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use in a text-to-speech system comprising a computer-implemented linguistic analysis component operative to generate a phonetic transcription based upon input text, a speech base comprising speech unit recordings associated with a plurality of styles of speech, and at least one computer-implemented speech generation component operative to generate output speech from stored speech unit recordings based at least in part on the phonetic transcription, the method comprising acts of:

(A) receiving, by the linguistic analysis component, input text produced by a text-producing application, wherein the text produced by a text-producing application comprises a speech style indication indicating a style of speech to be output by the text-to-speech system for an associated segment of the input text;

(B) generating, by the linguistic analysis component, a phonetic transcription based at least in part on the input text, the phonetic transcription specifying a first style of speech of the plurality of styles of speech to be output by the at least one speech generation component for the segment of the input text; and (C) generating, by the at least one speech generation component, output speech based at least in part on the phonetic transcription generated in the act (B), wherein the generating comprises the at least one speech generation component selecting, from the speech unit recordings in the speech base, speech unit recordings associated with a second style of speech of the plurality of styles of speech, the second style of speech being different than the first style of speech, and concatenating the selected speech unit recordings to generate output speech in the first style.

2. The method of claim 1, wherein the first style is a didactic style, and the second style is a neutral style.

3. The method of claim 1, wherein the act (C) comprises the at least one speech generation component slowing down an output speech rate and/or inserting at least one pause in the output speech.

4. The method of claim 1, further comprising an act (D) of generating output speech for another segment of the input text by applying, to the other segment, a statistical model associated with a style of speech specified in the phonetic transcription for the other segment.

5. The method of claim 1, wherein the act (A) comprises receiving input text comprising a plurality of segments each having an associated speech style indication, at least one of the speech style indications being different than at least one other of the speech style indications, the act (B) comprises generating a phonetic transcription specifying a style of speech to be output for each one of the plurality of segments according to the speech style indication associated with the one segment, and the act (C) comprises generating output speech for each one of the plurality of segments according to the speech style indication associated with the one segment.

6. The method of claim 5, wherein the plurality of segments constitute a single sentence.

7. The method of claim 1, wherein the act (B) comprises the linguistic analysis component invoking one or more rules and/or components specific to a style of speech indicated by the speech style indication.

8. A text-to-speech system, comprising:

at least one storage facility storing a speech base comprising speech unit recordings associated with a plurality of styles of speech; and at least one computer processor programmed to;

receive input text produced by a text-producing application, wherein the text produced by a text-producing application comprises a speech style indication indicating a style of speech to be output by the text-to-speech system for an associated segment of the input text;

generate a phonetic transcription based at least in part on the input text, the phonetic transcription specifying a first style of speech of the plurality of styles of speech to be output for the segment of the input text; and generate output speech based at least in part on the generated phonetic transcription, the generating comprising selecting, from the speech unit recordings in the speech base, speech unit recordings associated with a second style of speech of the plurality of styles of speech, the second style of speech being different than the first style of speech, and concatenating the selected speech unit recordings to generate output speech in the first style.

9. The text-to-speech system of claim 8, wherein the first style is a didactic style, and the second style is a neutral style.

10. The text-to-speech system of claim 8, wherein the at least one computer processor is programmed to generate the output speech by slowing down an output speech rate and/or inserting at least one pause in the output speech.

11. The text-to-speech system of claim 8, wherein the at least one computer processor is programmed to generate output speech for another segment of the input text by applying, to the other segment, a statistical model associated with a style of speech specified in the phonetic transcription for the other segment.

12. The text-to-speech system of claim 8, wherein the at least one computer processor is programmed to:

receive input text comprising a plurality of segments each having an associated speech style indication, at least one of the speech style indications being different than at least one other of the speech style indications;

generate a phonetic transcription specifying a style of speech to be output for each one of the plurality of segments according to the speech style indication associated with the one segment; and generate output speech for each one of the plurality of segments according to the speech style indication associated with the one segment.

13. The text-to-speech system of claim 12, wherein the plurality of segments constitute a single sentence.

14. The text-to-speech system of claim 8, wherein the at least one computer processor is programmed to generate the phonetic transcription by invoking one or more rules and/or components specific to a style of speech indicated by the speech style indication in the input text.

15. At least one non-transitory computer-readable storage medium having instructions encoded thereon which, when executed in a computer system, cause the computer system to perform a method comprising acts of:

(A) receiving input text produced by a text-producing application, wherein the text produced by a text-producing application comprises a speech style indication indicating a style of speech to be output by the text-to-speech system for an associated segment of the input text;

(B) generating a phonetic transcription based at least in part on the input text, the phonetic transcription specifying a first style of speech to be output for the segment of the input text; and (C) generating output speech based at least in part on the phonetic transcription generated in the act (B), wherein the generating comprises selecting, from speech unit recordings in a speech base, speech unit recordings associated with a second style of speech that is different than the first style of speech, and concatenating the selected speech unit recordings to generate output speech in the first style.

16. The at least one non-transitory computer-readable storage medium of claim 15, wherein the act (A) comprises receiving input text comprising a plurality of segments each having an associated speech style indication, at least one of the speech style indications being different than at least one other of the speech style indications, the act (B) comprises generating a phonetic transcription specifying a style of speech to be output for each one of the plurality of segments according to the speech style indication associated with the one segment, and the act (C) comprises generating output speech for each one of the plurality of segments according to the speech style indication associated with the one segment.

* * * * *